(12) United States Patent
Gabor et al.

(10) Patent No.: US 10,829,305 B2
(45) Date of Patent: Nov. 10, 2020

(54) DRIVE ASSEMBLY FOR A MODULAR CONVEYOR

(71) Applicant: REXNORD INDUSTRIES, LLC, Milwaukee, WI (US)

(72) Inventors: Philip Michael Gabor, Thiensville, WI (US); Justin Michael Stefanko, Pewaukee, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 16/863,457

(22) Filed: Apr. 30, 2020

(65) Prior Publication Data

US 2020/0283234 A1    Sep. 10, 2020

Related U.S. Application Data

(63) Continuation of application No. 16/506,021, filed on Jul. 9, 2019, now Pat. No. 10,640,293, which is a continuation of application No. 16/307,008, filed as application No. PCT/US2017/036091 on Jun. 6, 2017, now Pat. No. 10,392,192.

(60) Provisional application No. 62/347,326, filed on Jun. 8, 2016.

(51) Int. Cl.
*B65G 17/24* (2006.01)
*B65G 39/20* (2006.01)
*B65G 17/40* (2006.01)

(52) U.S. Cl.
CPC ............. *B65G 17/24* (2013.01); *B65G 17/40* (2013.01); *B65G 39/20* (2013.01)

(58) Field of Classification Search
CPC ......... B65G 17/24; B65G 17/40; B65G 39/20
See application file for complete search history.

(56) References Cited

U.S. PATENT DOCUMENTS

| 3,147,844 | A | 9/1964 | Mountz |
| 3,669,481 | A | 6/1972 | Bergmann |
| 3,707,923 | A | 1/1973 | Woodling |
| 4,406,361 | A | 9/1983 | Konigs et al. |
| 4,821,169 | A | 4/1989 | Sites et al. |

(Continued)

FOREIGN PATENT DOCUMENTS

| CN | 200969936 Y | 11/2007 |
| CN | 101109431 A | 1/2008 |

(Continued)

OTHER PUBLICATIONS

Bayer Materialscience, Snap-Fit Joints for Plastics, a Design Guide, Jul. 14, 2015, 26 pages.

(Continued)

*Primary Examiner* — Gene O Crawford
*Assistant Examiner* — Keith R Campbell
(74) *Attorney, Agent, or Firm* — Quarles & Brady LLP

(57) ABSTRACT

A modular conveying assembly including a plurality of modules joined together, each module including a bushing housing, a coupling housed in the bushing housing, an axle coupled to the coupling and supported for rotation relative to the module, a drive pin coupled to the coupling, and a driven surface fixed to the drive pin. The modular conveying assembly also including a driving member that is in selective engagement with the driven surface to affect rotation of the axle.

19 Claims, 6 Drawing Sheets

(56) References Cited

U.S. PATENT DOCUMENTS

| | | | |
|---|---|---|---|
| 4,880,107 | A | 11/1989 | Deal |
| 5,096,050 | A | 3/1992 | Hodlewsky |
| 5,573,105 | A | 11/1996 | Palmaer |
| 5,810,242 | A | 9/1998 | Cahill et al. |
| 5,927,477 | A | 7/1999 | Meittunen |
| 6,148,989 | A | 11/2000 | Ecker |
| 6,651,400 | B1 | 11/2003 | Murphy |
| 8,151,978 | B2 | 4/2012 | Wieting et al. |
| 9,227,785 | B2 | 1/2016 | Chinnock et al. |
| 9,908,717 | B2* | 3/2018 | Stefanko ............... B65G 17/40 |
| 10,040,635 | B2* | 8/2018 | Stefanko ............ B65G 47/8892 |
| 2003/0141170 | A1 | 7/2003 | Yamashita et al. |
| 2009/0008218 | A1 | 1/2009 | Fourney |
| 2014/0116853 | A1* | 5/2014 | Chinnock ............. B65G 17/40 198/779 |

FOREIGN PATENT DOCUMENTS

| | | |
|---|---|---|
| CN | 201118426 Y | 9/2008 |
| CN | 201302265 Y | 9/2009 |
| CN | 201428644 Y | 3/2010 |
| WO | 2016070000 A1 | 5/2016 |
| WO | 2016070042 A1 | 5/2016 |

OTHER PUBLICATIONS

Wikipedia, "Flange", https://en.wikipedia.org/w/index.php?title=Flange&oldid=713306450, Apr. 3, 2016, 5 pages.

Wikipedia, "Plain Bearing", https://en.wikipedia.org/w/index.php?title=Plain_bearing&oldid=713119745, Apr. 1, 2016, 12 pages.

Wikipedia, "Snap-fit", https://en.wikipedia.org/w/index.php?title=Snap-fit&oldid=679338973, Sep. 3, 2015, 3 pages.

Wikipedia, "Spline (Mechanical)", https://en.wikipedia.org/w/index.php?title=Spline_(mechanical)&oldid=702310984, Jan. 23, 2016, 4 pages.

PCT International Search Report and Written Opinion, PCT/US2017/036091, dated Sep. 1, 2017, 10 pages.

European Patent Office, Extended European Search Report, Application No. 17810828.8, dated Feb. 6, 2020, 11 pages.

China National Intellectual Property Administration, First Office Action and Search Report, Application No. 201780035445.5, dated Apr. 23, 2020, 12 pages.

\* cited by examiner

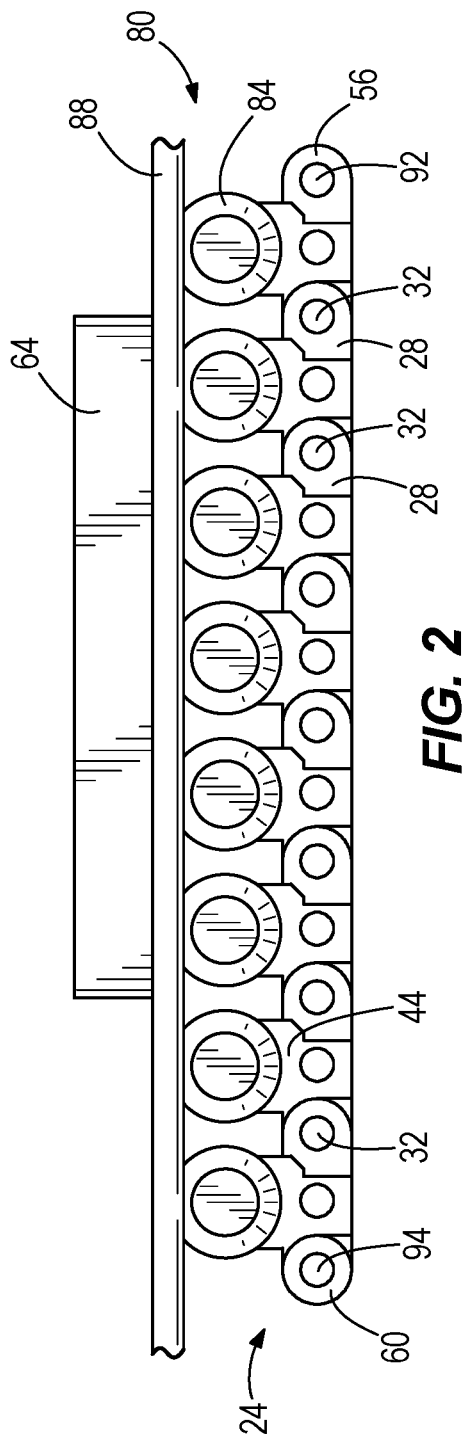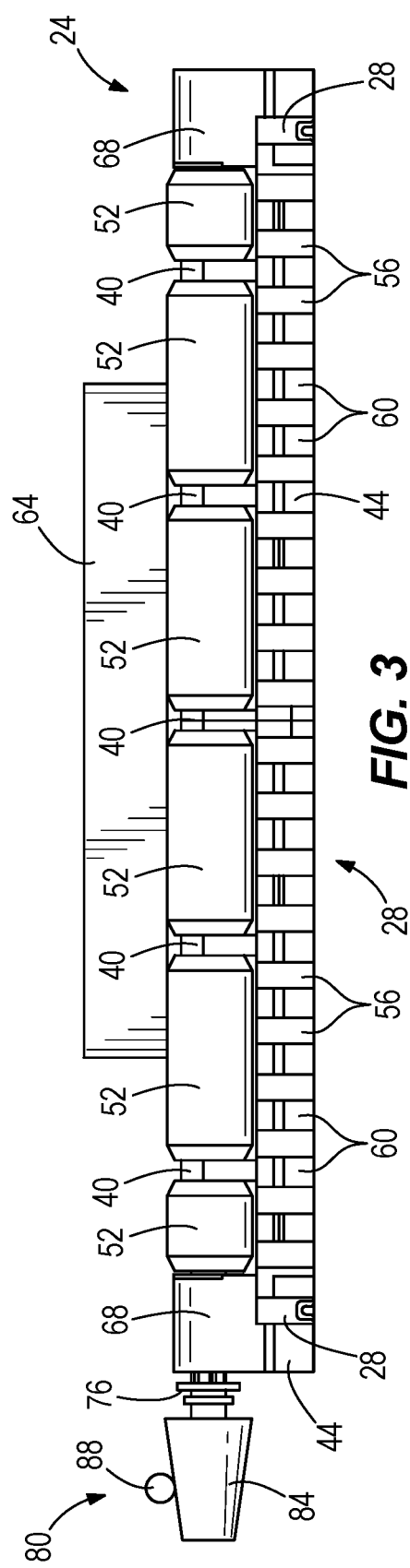

DRIVE ASSEMBLY FOR A MODULAR CONVEYOR

RELATED APPLICATIONS

This application is a continuation of U.S. patent application Ser. No. 16/506,021 filed on Jul. 9, 2019, which is a continuation of U.S. patent application Ser. No. 16/307,008 filed on Dec. 4, 2018, now U.S. Pat. No. 10,392,192 issued on Aug. 27, 2019, which represents the national stage entry of PCT International Application No. PCT/US2017/036091 filed on Jun. 6, 2017, which claims priority to U.S. Provisional Patent Application No. 62/347,326 filed on Jun. 8, 2016, the entire contents of which are incorporated herein by reference as if set forth in their entirety.

STATEMENT REGARDING FEDERALLY SPONSORED RESEARCH

Not Applicable.

BACKGROUND

The invention relates generally to modular conveyor belts and chains, and more particularly to an active control roller top conveyor module and a modular conveying assembly including at least one of the conveyor modules.

Modular conveyors include modules connected together to form a belt or chain that is supported by a frame and driven to transport a product. Each module has a support surface that supports the product as the belting or chain is driven along the frame. Adjacent modules are connected to each other by hinge pins inserted through hinge members extending from adjacent modules in the direction of the belt travel.

SUMMARY

Modular belts can transport products in the direction of conveyor travel, but have difficulty accumulating a product without introducing high backline pressure. In addition, high levels of friction typically exist between the modular belt and the products during accumulation. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is beneficial to have a portion of the roller extend above the module to engage the object being conveyed to reduce backline pressure, the roller diameter is related to the hinge pin location and the height of the module. Unfortunately, this often results in requiring a large diameter roller that extends both above and below the module even when that configuration is not always desired. Moreover, supporting the roller on the pin alone can result in undesirable pin wear.

Rexnord Industries, LLC of Milwaukee, Wis. developed roller top conveying modules that include roller axle supports that support freewheeling rollers above a module top surface; illustrated, for example, in: U.S. Pat. Nos. 8,151,978; 5,096,050; 4,880,107; and 4,821,169. These modules are easily assembled and do not require oversize rollers extending through the conveyor modules. Also, these modules allow accumulation of product being conveyed by a conveying system formed from modules by providing a low backline pressure when the products are stopped on the moving modules. Absent individual external stops for each product being conveyed, the conveyed products engage other products when accumulating on the conveyor system.

Additionally, Rexnord Industries, LLC of Milwaukee, Wis. developed active control roller modules that further reduce product-to-product contact during accumulating and product manipulation, such as shown in U.S. Pat. No. 9,227,785.

Embodiments provide a modular conveying assembly with active roller control for reducing backline pressure without product-to-product contact during accumulation. The conveying assembly includes a first roller belt module having a top surface and at least one first roller axle support extending above the top surface. At least one roller is supported above the top surface by the first roller axle support. The at least one roller is rotatably coupled to a drive axle such that rotation of the drive axle causes rotation of the roller. A clutch includes a driven surface fixed to the drive axle, and a driving member that is engageable with the driven surface to rotatably drive the drive axle and the roller.

In the detailed description below, preferred embodiments will be described in reference to the accompanying drawings. These embodiments do not represent the full scope of the invention. Rather, the invention may be employed in other embodiments. Reference should therefore be made to the claims herein for interpreting the breadth of the invention.

BRIEF DESCRIPTION OF THE DRAWINGS

FIG. 2 is a left side view of the modular conveying assembly of FIG. 1.

FIG. 3 is a front view of the modular conveying assembly of FIG. 1.

DETAILED DESCRIPTION OF PREFERRED EMBODIMENTS

Figure 1:
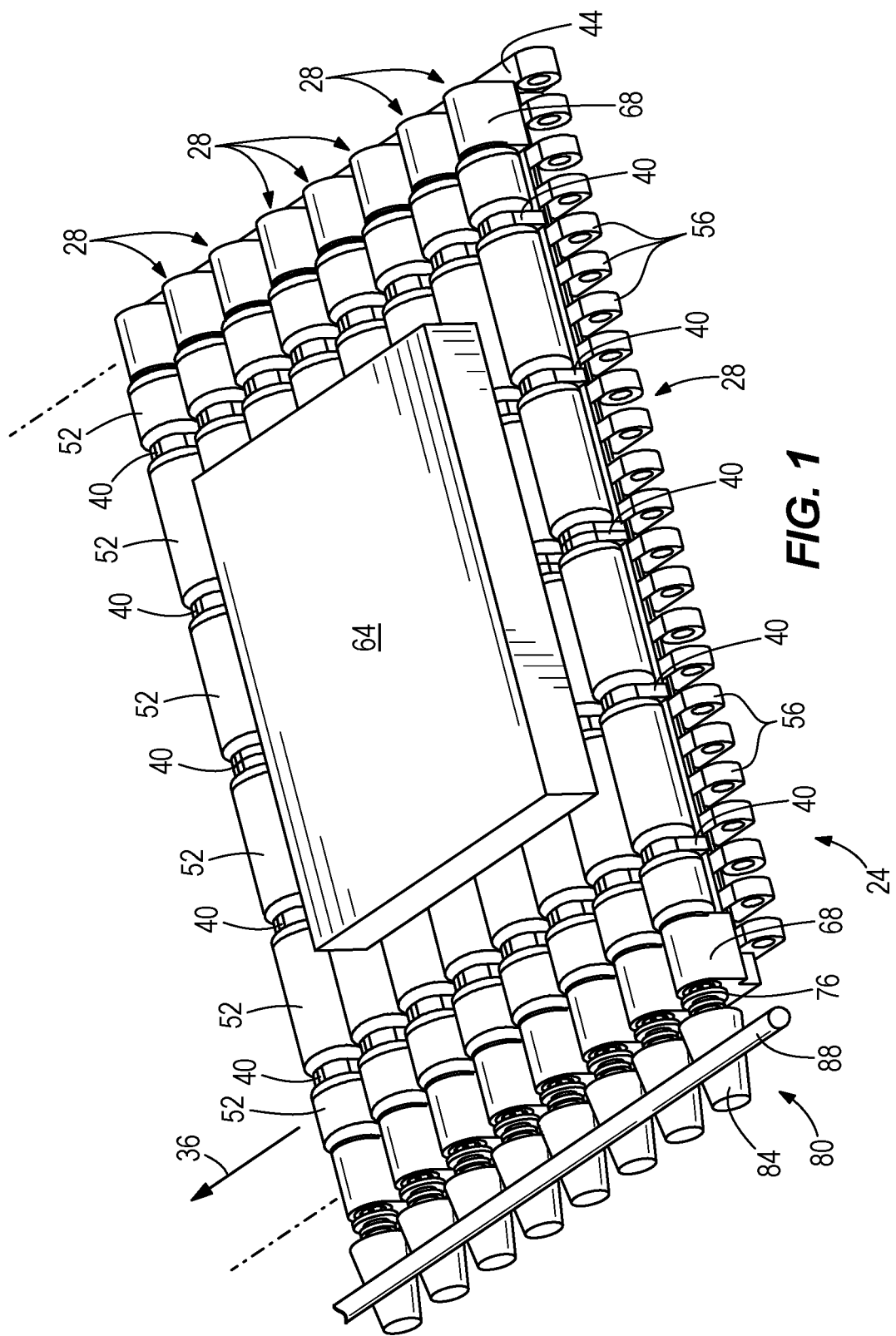
FIG. 1 is a pictorial view of a modular conveying assembly including a driving member and supporting a package.

As shown in FIG. 1, a modular conveying assembly, or continuous belt 24 includes a plurality of belt modules 28 assembled in an edge-to-edge configuration. Hinge pins 32 (see FIG. 2) join adjacent belt modules 28, and pivotally connect the adjacent belt modules 28 in a direction of belt travel 36 (see FIG. 4). Each belt module 28 includes roller axle supports 40 that extend upwardly from a module body 44 of each belt module 28 and support a roller axle 48 (see FIG. 4) having a plurality of rollers 52 fixed thereto. The roller axle supports 40 extend upwardly from leading edge hinge members 56 and trailing edge hinge members 60 (see FIG. 3). The rollers 52 rotatably engage an object 64 being conveyed by the continuous belt 24 to reduce friction between the continuous belt 24 and the object 64, and selectively convey the object 64 relative to the module body 44 in a direction of belt travel 36. The belt modules 28 can be formed by injection molding from materials such as acetal, polyethylene, polypropylene, or nylon. Each belt module 28 of the continuous belt 24 also includes a bushing housing 68, a coupling 72 (see FIG. 4), a drive pin 76, and a clutch 80 that includes a driven surface 84 and a driving member 88.

As shown in FIG. 2, each leading edge hinge member 56 includes an opening 92 for receiving the hinge pin 32. Each leading edge hinge member opening 92 receives one hinge pin 32 and pivotally connects the leading edge hinge members 56 of one belt module 28 to trailing edge hinge members 60 of an upstream belt module 28. The trailing edge hinge members 60 include openings 94 that receive the hinge pin 32 to pivotally connect the trailing edge hinge members 60 of the belt module 28 to leading edge hinge members 56 of a downstream belt module 28.

Figure 4:
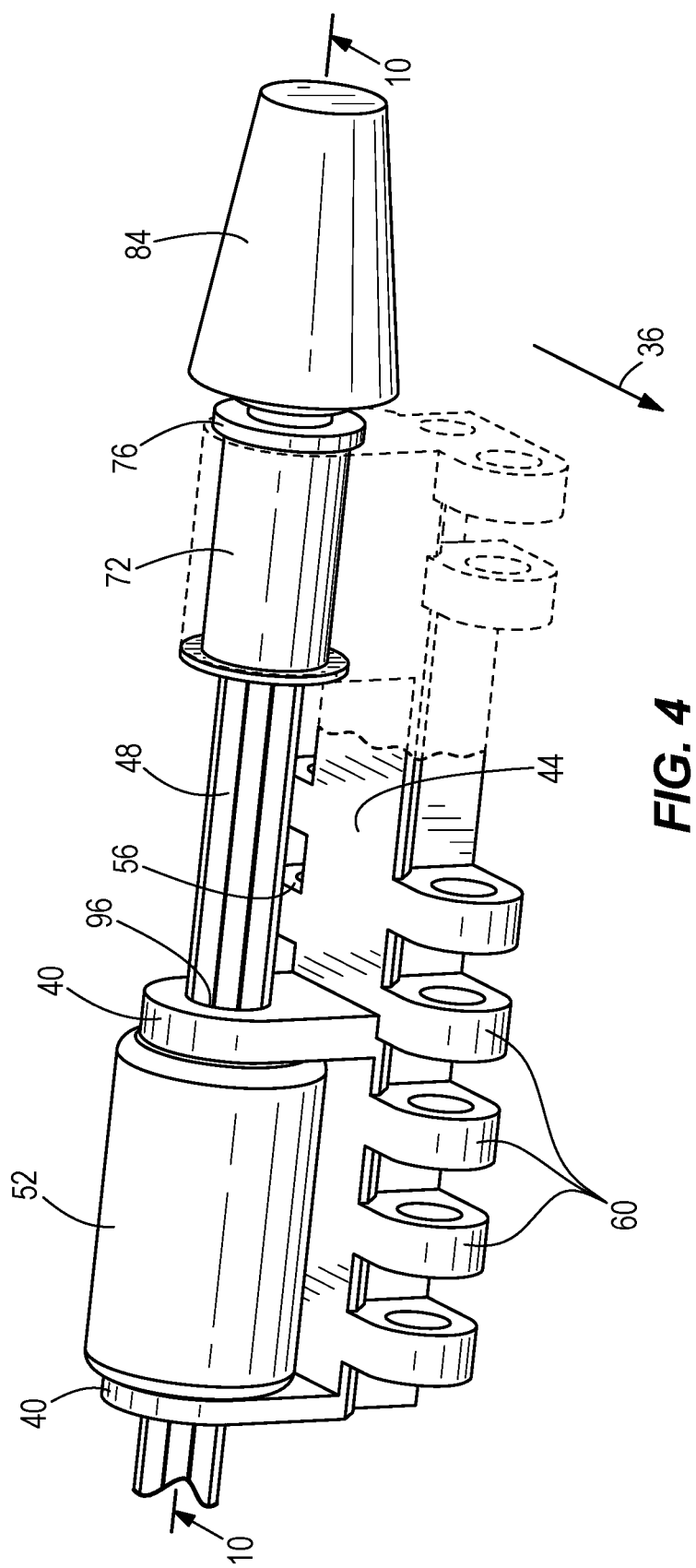
FIG. 4 is a detail view of a portion of a belt module of the modular conveying assembly of FIG. 1.

As shown in FIG. 4, the roller axle supports 40 are spaced across the module body 44 in a row transverse to the direction of belt travel 36 (see FIG. 1). Each roller axle support 40 includes a coaxial support opening 96 for receiving the roller axle 48. Advantageously, the axle supports 40 do not allow the roller axle 48 to pop upwardly away from the belt modules 28 if the roller 52 or roller axle 48 catches an object 64. Although six axle supports 40 in a single row on each belt module 28 are shown, a single axle support 40 extending upwardly from the module body 44 forming a row or a plurality of axle support 40 rows on a single belt module 28 can be provided.

As further shown in FIG. 4, the rollers 52 support the object 64 being conveyed by the continuous belt 24 above the module body 44 and are rotatably fixed to the roller axle 48. At least a portion of each roller 52 extends above the roller axle supports 40 to engage the object 64 being conveyed by the continuous belt 24. Preferably, each roller 52 is molded from a plastic, and includes a through hole 100 (see FIG. 5) formed there through for receiving the roller axle 48. The rollers 52 can be rotatably fixed to the roller axle 48 by chemically bonding the roller 52 to the roller axle 48, fusing the roller 52 to the roller axle 48, integrally forming the roller axle 48 and roller 52 as a single piece, forming a through hole 100 (see FIG. 10) axially through the roller 52 and inserting the roller axle 48 through the roller through hole 100, or the like. Although a plastic roller 52 is disclosed, the roller 52 can be formed from any material, such as elastomers, metals, and the like, suitable for the particular application. In one embodiment, rollers 52 may be end connected to one another by teeth. In another embodiment rollers 52 may be end connected to one another by magnets. These connections between rollers 52 provide a way to transfer rotation without rigidly joining the rollers 52 to the roller axle 48. Other configurations are contemplated for coupling the rollers 52 together independent of the roller axle 48. For example, couplings, taper locks, and other connection types are usable.

Figure 5:
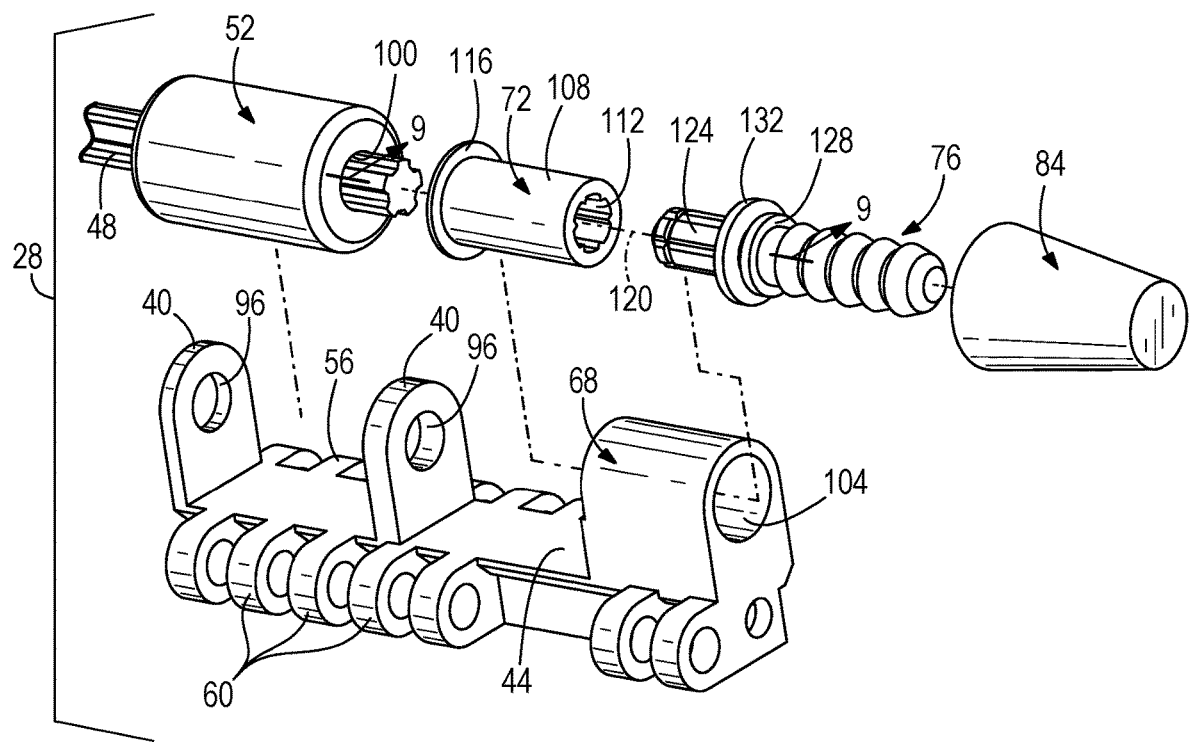
FIG. 5 is an exploded view showing the belt module of FIG. 4.

As shown in FIG. 5, the bushing housing 68 of each belt module 28 extends upward from the module body 44 of the belt module 28 and defines a bushing housing aperture 104. The bushing housing 68 allows the roller axle 48 to rotate. The bushing housing 68 can inhibit vibration of the roller axle 48.

The roller axle 48 can be formed from any material, such as a polymeric material or metal. Polymeric roller axles 48 are generally preferred because they typically are lighter and produce less noise. Each roller axle 48 supports rollers 52. Preferably, a single roller 52 is disposed between a pair of axle supports 40, however, more than one roller 52 can be provided between a pair of axle supports 40. In one embodiment, the roller axle 48 may define a spline shape, a keyway, or a D-shape. Additionally, the roller axle 48 may define other shapes (e.g., square, oval, pegged, star, etc.).

Figure 6:
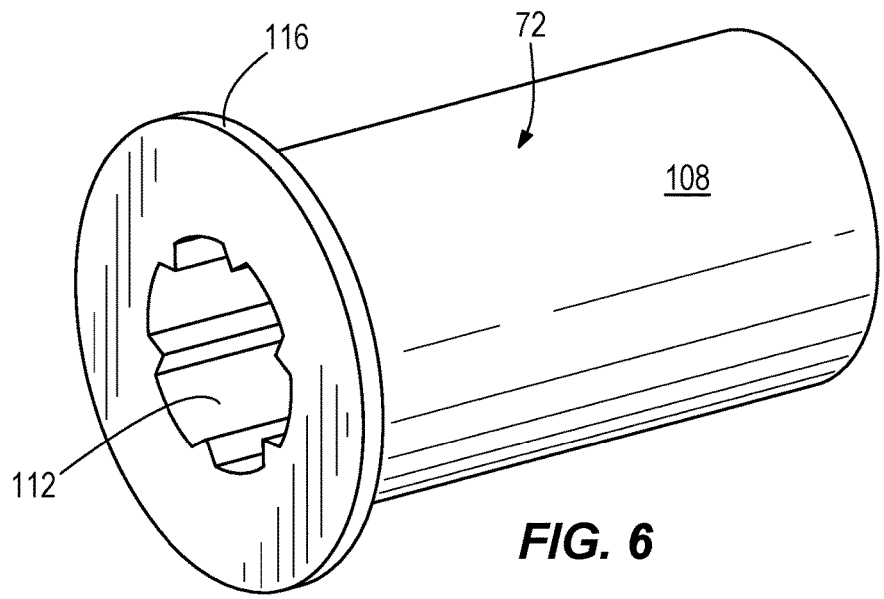
FIG. 6 is a pictorial view of a coupling.
Figure 9:
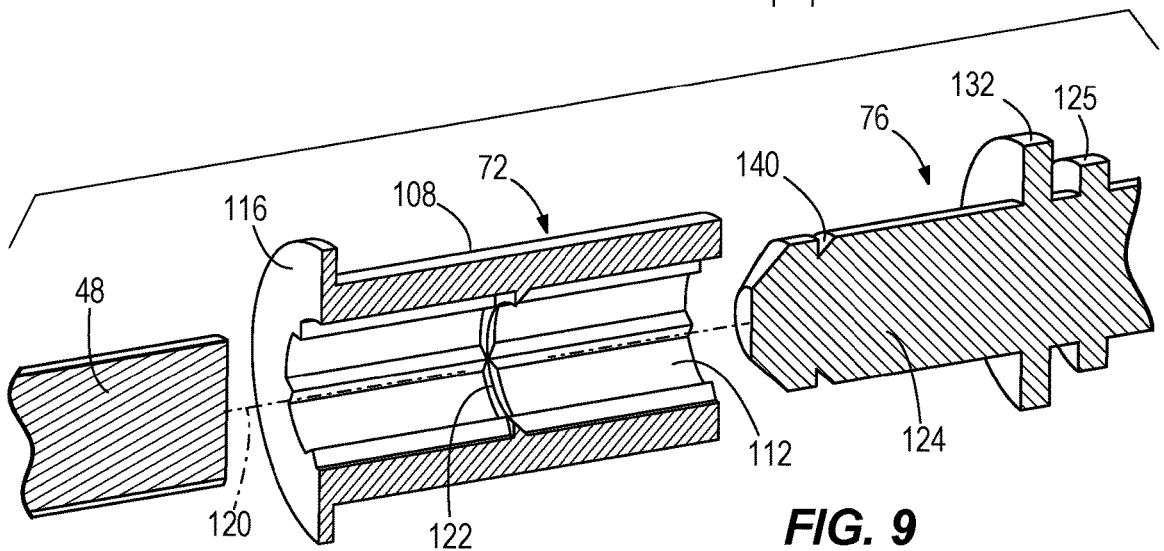
FIG. 9 is a cross-sectional view of the belt module taken along the line 9-9 in FIG. 5.

As shown in FIG. 6, the coupling 72 includes a cylindrical tube structure having a wall thickness sufficient for bearing rotational loads. The coupling tube structure includes an outer surface 108 sized to be rotationally received within the bushing housing aperture 104 and a coupling mating feature in the form of a splined coupling aperture 112 sized to receive the roller axle 48. In other embodiments, the coupling mating feature can be on the outside surface of the coupling tube structure or define a different profile. For example, the coupling mating feature can include a barbed connection, a keyed connection, or other connection as desired. The coupling 72 also includes a shoulder 116 that extends radially outward from the outer surface 108 substantially perpendicular to an axis of rotation 120, and a projection 122 (see FIG. 9) that extends into the splined coupling aperture 112.

Figure 7:
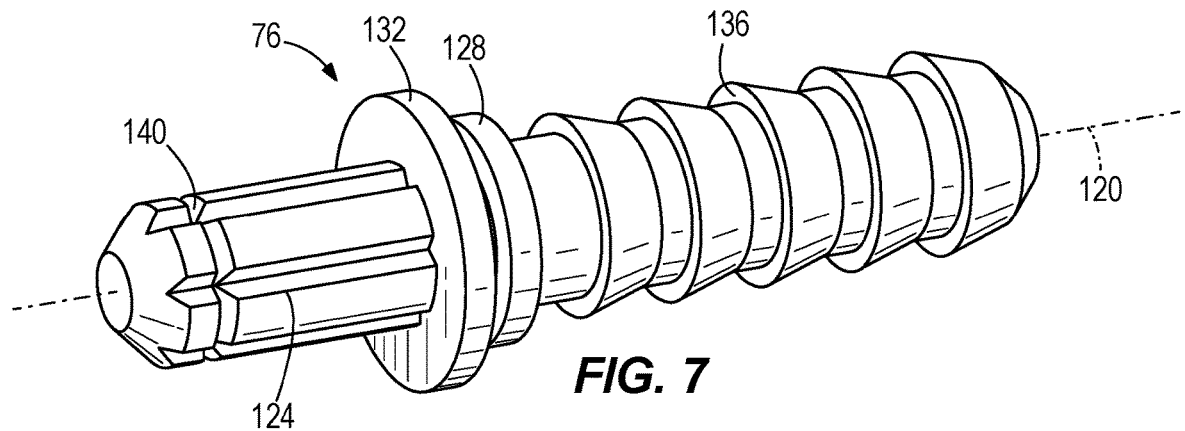
FIG. 7 is a pictorial view of a drive pin.

As shown in FIG. 7, the drive pin 76 includes a drive pin mating feature in the form of a drive pin shaft 124, a first shoulder 128, a second shoulder 132, and a coupling in the form of a barbed shaft 136. The drive pin shaft 124 is splined to match the splined coupling aperture 112 and includes a recess 140 sized to engage the projection 122. Although the drive pin shaft 124 is shown in FIG. 7, it is to be appreciated that the drive pin mating feature can include a variety of geometries and mating forms, such as, for example, a keyway or a D-shape. The first shoulder 128 and the second shoulder 132 extend radially outward substantially perpendicular to the axis of rotation 120. As shown in FIG. 7, the second shoulder 132 can extend further outward than the first shoulder 128

Figure 8:
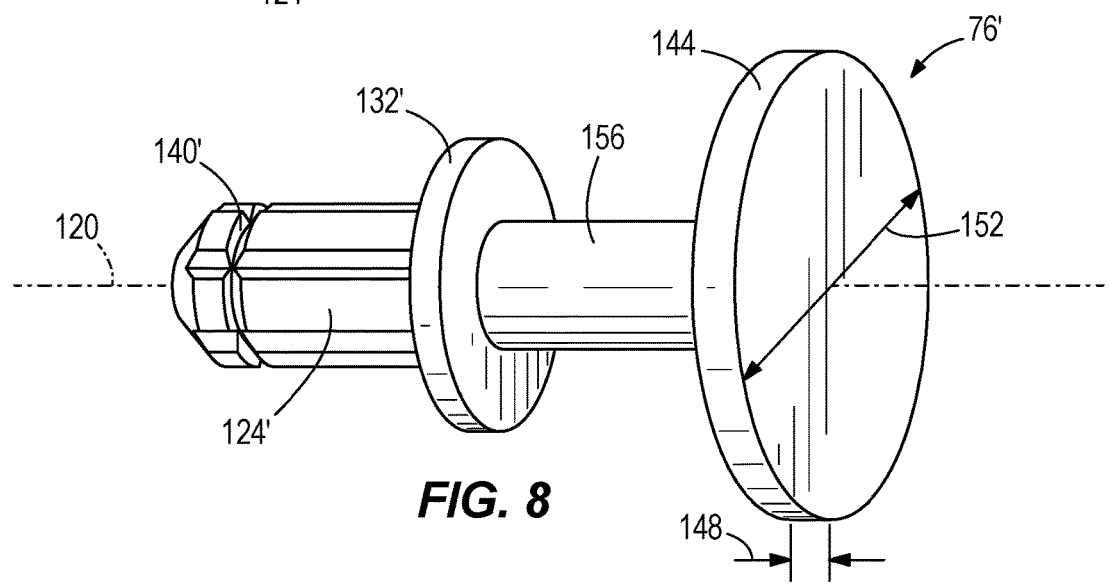
FIG. 8 is a pictorial view of an alternative drive pin.

As shown in FIG. 8, an alternative embodiment of a drive pin 76' includes a drive pin mating feature in the form of a drive pin shaft 124', a shoulder 132', and a driven surface in the form of a magnetic plate or rotor 144. The drive pin shaft 124' includes a recess 140' sized to engage the projection 122. The rotor 144 can be formed from a ferris material or other magnetically-active material and defines a rotor width 148 and a rotor diameter 152. A spacer shaft 156 is disposed between the rotor 144 and the shoulder 132'.

Figure 10:
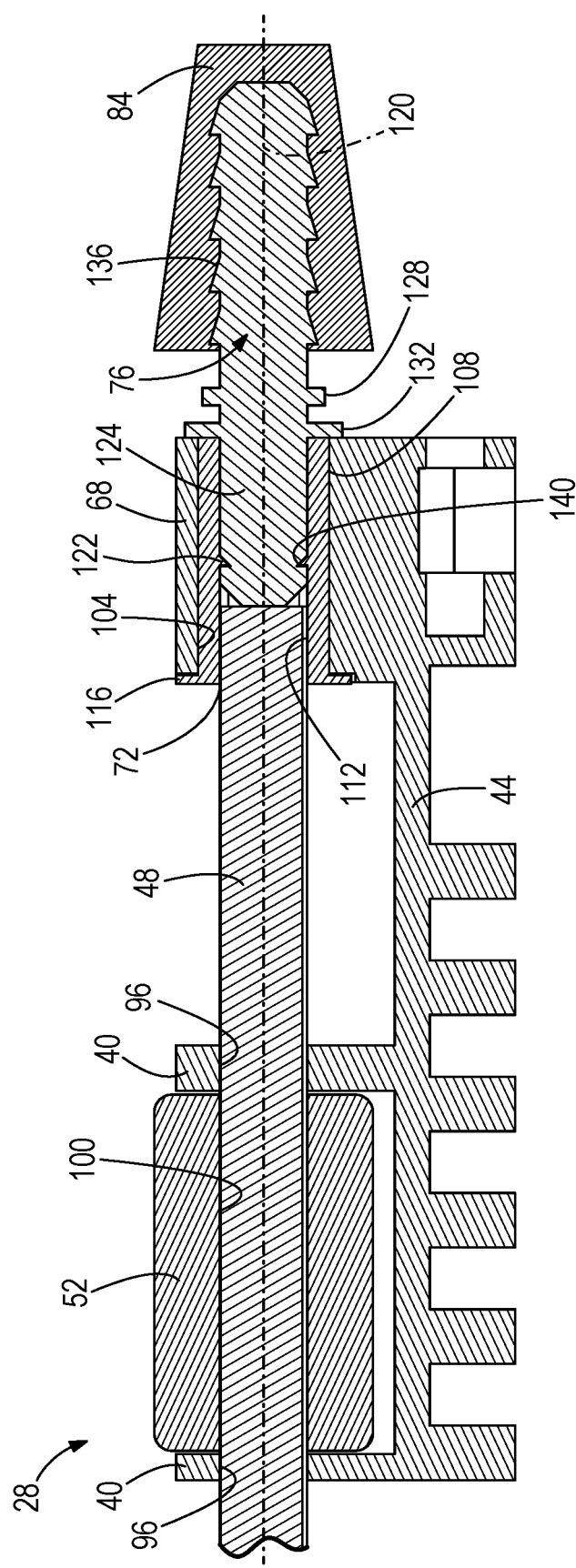
FIG. 10 is a cross-sectional view of the assembly taken along the line 10-10 in FIG. 4.

As shown in FIG. 10, each belt module 28 is assembled by inserting the barbed shaft 136 of the drive pin 76 into the driven surface 84. In the embodiment shown in FIG. 10, the driven surface 84 is frustoconical shaped and formed from rubber. The barbed shaft 136 engages the driven surface 84 and rotation between the drive pin 76 and the driven surface 84 is inhibited.

The coupling 72 is then inserted into the bushing housing aperture 104 such that the outer surface 108 rotationally engages the bushing housing aperture 104 and the shoulder 116 abuts the bushing housing 68. With the coupling 72 installed in the bushing housing 68, the drive pin 76 is inserted into the coupling 72 such that the drive pin shaft 124 engages the splined coupling aperture 112 and the projection 122 is received within the recess 140. The engagement of the projection 122 and the recess 140 inhibits the removal of the drive pin 76 from the coupling 72. The second shoulder 132 is arranged adjacent the bushing housing 68 when the drive pin 76 is fully installed into the coupling 72.

The rollers 52 are then placed in there respective spaces between the axle supports 40 and the roller axle 48 is inserted through the coaxial support openings 96, the roller through holes 100, and into the splined coupling aperture 112. With the roller axle 48 installed, the driven surface 84, the drive pin 76, the coupling 72, the roller axle 48, and the rollers 52 are rotationally locked together to provide rotation about the axis of rotation 120.

In one embodiment, the drive pin 76 is male and the coupling 72 is female. In this embodiment, the drive pin 76 is inserted into the coupling 72, and the coupling mating feature on the inner surface of the coupling 72 engages with the drive pin mating feature on the outer surface of the drive pin 76. In another embodiment, the drive pin 76 is female and the coupling 72 is male. In this embodiment, the drive pin 76 is pushed around the coupling 72, and the coupling mating surface on the outer surface of the coupling 72 engages with the drive pin mating feature on the inner surface of the drive pin 76.

The continuous belt 24 is assembled by intermeshing the trailing edge hinge members 60 of one of the belt modules 28 with the leading edge hinge members 56 of the adjacent belt module 28, such that the trailing hinge member openings 94 of the one belt module 28 are aligned with the leading edge hinge member openings 92 of the other belt module 28. Hinge pins 32 are then slipped through the aligned hinge member openings to pivotally link the adjacent belt modules 28 together. The linking of multiple belt modules 28 creates the continuous belt 24.

In operation, the clutch 80 is actuated by selective engagement of the driving member 88 and the driven surface 84. In the embodiment shown in FIG. 1, the driving member 88 is a rod arranged to contact an upper portion of the driven surfaces 84. When the continuous belt 24 is moving in the direction of belt travel 36, and the driving member 88 is brought into engagement with the driven surfaces 84, the driven surfaces 84 are counter rotated relative to the direction of belt travel 36 and in turn cause the counter rotation of the drive pin 76. This counter rotation in turn translates to the roller 52, and the rollers 52 act on the object 64 to produce an accumulation effect where the continuous belt 24 continues to progress in the direction of belt travel 36 but the object 64 is maintained in an accumulation zone.

Alternatively, the clutch 80 can be arranged such that the driving member 88 engages a bottom portion of the driven surfaces 84 and produces an accelerating effect on the object 64. Further, multiple motion zones can be established to produce motion profiles including rotation, left or right movement, directional accumulation, directional acceleration, slowing, and other motion profiles, as desired.

The driving member 88 may be actuated vertically or horizontally in and out of engagement with the driven surface 84. Any actuation scheme may be used to bring the driving member 88 into contact with the driven surface 84, as desired.

In another embodiment, a clutch 80' includes a magnetic driving member 88' in the form of electromagnets or permanent magnets, and the drive pin 76' including the rotor 144. The driving member 88' is arranged to produce a magnetic eddy within the rotor 144 that will produce forward or counter rotation of the rollers 52 and produce a desired motion profile. Alternatively, the rotors 144 could include magnets or be magnetic themselves. The rotor width 148 and rotor diameter 152 affect the resultant force of the magnetic coupling between the driving member 88' and the rotor 144.

While there has been shown and described what are at present considered the preferred embodiments of the invention, it will be obvious to those skilled in the art that various changes and modifications can be made therein without departing from the scope of the invention defined by the appended claims. For example, the individual features described in the drawings may include one or more features from another embodiment.

We claim:

1. A module for use in a modular conveying assembly, the module comprising:
a bushing housing extending from a first end to a second end;
a coupling having a first shoulder and defining a first mating feature; and
a drive pin having a second shoulder and defining a second mating feature;
wherein the first shoulder of the coupling is adjacent to the first end of the busing housing;
wherein the second shoulder of the drive pin is adjacent to the second end of the busing housing; and
wherein the first mating feature and the second mating feature are configured to axially couple the coupling and the drive pin to the busing housing positioned between the first shoulder and the second shoulder.

2. The module of claim 1, wherein:
the first mating feature comprises one of a projection and a recess; and
the second mating feature comprises the other one of the one of the projection and the recess.

3. The module of claim 1, wherein:
the first shoulder extends radially outward from an outer coupling surface of the coupling in a direction that is perpendicular to an axis along the coupling; and
the second shoulder extends radially outward from an outer drive surface of the drive pin in a direction that is perpendicular to an axis along the drive pin.

4. The module of claim 1, further comprising a driven surface fixed to the drive pin, the driven surface configured to be selectively engaged to affect rotation of the drive pin and the coupling.

5. The module of claim 1, wherein:
the coupling defines a splined aperture;
the drive pin defines a splined drive pin shaft; and
the splined aperture and the splined drive pin shaft are configured to rotatably couple the coupling and the drive pin.

6. A coupling assembly configured for use with a belt module including a bushing housing and a roller axle, the coupling assembly comprising:
a coupling configured to be rotatably fixed to the roller axle and defining a first mating feature; and
a drive pin defining a second mating feature;
wherein at least a portion of the coupling and at least a portion of the drive pin are configured to be housed within the bushing housing; and
wherein the first mating feature and the second mating feature are configured to axially couple the coupling and the drive pin.

7. The coupling assembly of claim 6, wherein:
the first mating feature comprises one of a projection and a recess; and
the second mating feature comprises the other one of the one of the projection and the recess.

8. The coupling assembly of claim 6, wherein:
the coupling defines a male counterpart with the first mating feature configured on an outer surface of the male counterpart; and
the drive pin defines a female counterpart with the second mating feature configured on an inner surface of the female counterpart.

9. The coupling assembly of claim 6, wherein the first mating feature and the second mating feature axially capture the bushing housing between the coupling and the drive pin.

10. The coupling assembly of claim 6, wherein:
the coupling defines a first shoulder;
the drive pin defines a second shoulder; and
the first shoulder is adjacent to a first end of the bushing housing and the second shoulder is adjacent to a second end of the busing housing to inhibit axial movement of the coupling and the drive pin relative to the bushing housing.

11. The coupling assembly of claim 6, further comprising a driven surface fixed to the drive pin, the driven surface configured to be selectively engaged to affect rotation of the roller axle.

12. A coupling assembly configured for use with a belt module, the coupling assembly comprising:
a coupling extending from a first coupling end to a second coupling end;
a first mating feature of the coupling at a first position between the first coupling end and the second coupling end;
a drive pin extending from a first drive pin end to a second drive pin end;
a second mating feature of the drive pin at a second position between the first drive pin end and the second drive pin end; and
a shoulder extending from the drive pin; and
wherein the first mating feature and the second mating feature are configured to axially couple the coupling and the drive pin; and
wherein the first position of the first mating feature and the second position of the second mating feature are configured such that the shoulder of the drive pin is positioned adjacent to at least one of the second coupling end of the coupling and a bushing housing within which at least one of the coupling and drive pin are at least partially housed.

13. A coupling assembly configured for use with a belt module, the coupling assembly comprising:
a coupling extending from a first coupling end to a second coupling end;
a first mating feature of the coupling at a first position between the first coupling end and the second coupling end;
a drive pin extending from a first drive pin end to a second drive pin end;
a second mating feature of the drive pin at a second position between the first drive pin end and the second drive pin end; and
a shoulder extending from the drive pin; and
wherein the first mating feature and the second mating feature are configured to axially couple the coupling and the drive pin; and
wherein the first position of the first mating feature and the second position of the second mating feature are configured such that the shoulder of the drive pin is positioned adjacent to an end face of the belt module.

14. A coupling assembly configured for use with a belt module, the coupling assembly comprising:
a coupling extending from a first coupling end to a second coupling end, the coupling defines a coupling aperture formed between the first coupling end and the second coupling end;
a first mating feature of the coupling at a first position between the first coupling end and the second coupling end, the first mating feature defines a recess formed in the coupling aperture;
a drive pin extending from a first drive pin end to a second drive pin end, the drive pin defines an outer surface; and
a second mating feature of the drive pin at a second position between the first drive pin end and the second drive pin end, the second mating feature defines a projection formed in the outer surface; and
wherein the first mating feature and the second mating feature are configured to axially couple the coupling and the drive pin.

15. A coupling assembly configured for use with a belt, the coupling assembly comprising:
a coupling extending from a first coupling end to a second coupling end;
a first mating feature of the coupling at a first position between the first coupling end and the second coupling end;
a drive pin extending from a first drive pin end to a second drive pin end; and
a second mating feature of the drive pin at a second position between the first drive pin end and the second drive pin end; and
wherein the first mating feature and the second mating feature are configured to axially couple the coupling and the drive pin;
wherein the coupling defines a male counterpart with the first mating feature configured on an outer surface of the male counterpart; and
wherein the drive pin defines a female counterpart with the second mating feature configured on an inner surface of the female counterpart.

16. A coupling configured for use with a belt module including a roller axle and a drive pin, the coupling comprising:
a body extending from a first coupling end to a second coupling end;
a roller axle mating feature proximate to the first end and configured to rotatably couple to the roller axle; and
a first drive pin mating feature between the first coupling end and the second coupling end and configured to axially couple to a second drive pin mating feature defined by the drive pin;
wherein the first drive pin mating feature includes one of a radial recess and a radial protrusion; and
wherein the second drive pin mating features includes the other of the one of the radial recess and the radial protrusion.

17. The coupling of claim 16, wherein the body defines a splined coupling aperture.

18. The coupling of claim 16, wherein:
the coupling defines a coupling aperture that extends between the first coupling end and the second coupling end;
the roller axle defines an axle end that is inserted into the coupling aperture proximate the first coupling end to rotatably fix the roller axle and the coupling; and
the drive pin defines a drive pin end that is inserted into the coupling aperture proximate the second coupling end to rotatably fix the drive pin and the coupling.

19. A coupling configured for use with a belt module including a roller axle and a drive pin, the coupling comprising:

a body extending from a first coupling end to a second coupling end;

a roller axle mating feature proximate to the first end and configured to rotatably couple to the roller axle; and a first drive pin mating feature between the first coupling end and the second coupling end and configured to axially couple to a second drive pin mating feature defined by the drive pin; and wherein the drive pin defines a shoulder that is spaced along the drive pin from the second drive pin mating feature such that the shoulder is adjacent to a side of the belt module when the second drive pin mating feature and the first drive pin mating feature are axially coupled.

\* \* \* \* \*

UNITED STATES PATENT AND TRADEMARK OFFICE
CERTIFICATE OF CORRECTION

PATENT NO. : 10,829,305 B2
APPLICATION NO. : 16/863457
DATED : November 10, 2020
INVENTOR(S) : Philip Michael Gabor et al.

Page 1 of 1

It is certified that error appears in the above-identified patent and that said Letters Patent is hereby corrected as shown below:

In the Claims

Column 8, Claim 15, Line 15-16, "belt, the" should be --belt module, the--.

Signed and Sealed this
Second Day of February, 2021

Drew Hirshfeld
*Performing the Functions and Duties of the
Under Secretary of Commerce for Intellectual Property and
Director of the United States Patent and Trademark Office*